United States Patent [19]

Cornwell et al.

[11] 4,088,804

[45] May 9, 1978

[54] CEMENTITIOUS COATINGS AND METHOD

[76] Inventors: Charles E. Cornwell, 7104 Marlan Dr.; Mark Plunguian, 6912 Columbia Dr., both of Alexandria, Va. 22307

[21] Appl. No.: 768,949

[22] Filed: Feb. 16, 1977

Related U.S. Application Data

[63] Continuation-in-part of Ser. No. 610,990, Sep. 8, 1975, Pat. No. 4,039,170, and Ser. No. 649,895, Jan. 16, 1976, Pat. No. 4,036,839.

[51] Int. Cl.² ............... C04B 7/35; B32B 13/04; B32B 13/06; C04B 39/02
[52] U.S. Cl. .................... 428/220; 106/314; 264/256; 427/427; 260/29.6 S
[58] Field of Search ............. 106/314; 260/29.6 S; 264/337, 256; 428/220; 427/427

[56] References Cited

U.S. PATENT DOCUMENTS

| | | | |
|---|---|---|---|
| 3,767,436 | 10/1973 | Peppler | 106/314 X |
| 3,779,971 | 12/1973 | Isenburg | 260/29.6 S |
| 3,879,909 | 4/1975 | Lamoria | 260/29.6 S |
| 3,972,723 | 8/1976 | Ballé | 106/314 X |
| 3,995,086 | 11/1976 | Plungion | 428/409 X |
| 4,014,840 | 3/1977 | Emig | 260/29.6 S |

*Primary Examiner*—Thomas P. Pavelko

[57] ABSTRACT

Protective and decorative coatings of about two mills and greater thickness are produced from hydraulic cement slurries formulated with finely divided mineral aggregates, a film-forming synthetic polymer latex, a "super" water reducer, and a rust inhibitor. These constituents are formulated into liquid and powder components which are mixed prior to spraying or brushing to produce the coating. The coatings are non-burning and are applicable for interior and exterior use. Very fast set of the cement are obtainable by admixing an accelerator to either the liquid or powder component and mixing the two components continuously by passing through a static in-line mixing device located in a feed line duct just before a spray nozzle.

8 Claims, No Drawings

CEMENTITIOUS COATINGS AND METHOD

CROSS REFERENCE TO RELATED APPLICATIONS

This application is a continuation-in-part of our co-pending applications Ser. No. 610,990, filed Sept. 8, 1975 now U.S. Pat. No. 4,039,170, and Ser. No. 649,895, filed Jan. 16, 1976 now U.S. Pat. No. 4,036,839.

BACKGROUND OF THE INVENTION

A primary object of the invention is to provide non-burning protective and decorative coatings for indoor and outdoor applications on all types of steel structures, concrete and brick, as well as for highway marking and striping.

Another object of the invention is to provide a novel method for continuous mixing of the formulations and for extremely fast setting of the coating as it is being applied to a substrate.

SUMMARY OF THE INVENTION

Our application Ser. No. 649,895 describes a process for forming shaped articles with reflective surfaces by casting hydraulic cements, to which "super" water reducers had been admixed, into molds of water-repellent synthetic polymers having glossy surfaces, or molds coated with water-repellent polymers.

These water reducers have only become available in the last few years. By admixing about 0.5 – 2.0% of such water reducers to portland cement, it is possible to produce practical mortars and concrete with significantly lower water content, without decreasing the "slump" or workability of the cement slurries. Examples of such water reducers are as follows:

"Mighty" (ICI United States). This consists of about 90% of a polymer of the sodium salt of naphthalene sulfonic acid partially condensed with formaldehyde, and about 10% sodium gluconate.

"Melmont L-10" (American Admixtures) is similar to "Mighty" except that a melamine ring is used instead of a naphthalene ring in the polymer component.

"Lomar D" (Diamond-Shamrock) is identical to the 90% polymer component of "Mighty".

"FX-32" (Fox Industries) is similar to Melment.

When portland cement, or calcium aluminate cement slurries, with aggregates, are sprayed or otherwise coated unto substrates in thin layers of about 2 to 60 mils thickness, extremely weak powdery coatings are obtained. This deficiency may be only partly overcome by the addition of humectants and film-formers to the formulations.

It has now been found that when one of the above "super" water reducers are added to a cementitious formulation containing a relatively small percentage of a film-forming synthetic latex, a much tougher, adherent coating is obtained, even if the layer is only about two mils in thickness. Other important advantages of these new coatings are that they are non-burning and may be produced with mat, semi-glossy, or highly reflective glossy surfaces.

We prefer to use fine mineral aggregates of about 100 mesh and finer in a ratio of about 15-100 parts by weight based on the weight of the hydraulic cement. A presently preferred aggregate is finely-ground calcite or calcium carbonate. Other aggregates which we have used in our formulations are fine particle silicas, aluminum trihydrate and aluminum oxide.

The synthetic latex, or emulsion, may be one of the numerous latexes which are stable when mixed with hydraulic cement and which give tacky films when dried at ambient temperatures. Examples of such latexes are the emulsions of vinyl acetate homopolymer, vinyl acetate-acrylic copolymer, internally plasticized and externally plasticized vinyl chloride copolymers, polyacrylic emulsions, styrene-butadiene copolymers, vinyl chloride-vinylidene chloride copolymers, vinyl chloride-vinylidene chloride-acrylic terpolymers, and others. The ratio of the latex (of about 50–55% total solids) to the weight of cement is about 5 to 30 parts by weight, or about 2.5-16 parts equivalent polymer.

It was found to be advantageous to use a small amount of a retarder in the cement formulation, of the order of about 0.05-0.5% on the weight of the cement. Some of the retarders which we have used are glycerine, ethylene glycol, acetic acid, citric acid, sodium citrate, sugar, and zinc oxide.

The coatings may be made more waterproof by the addition of a small amount of calcium stearate, in the range of about 0.2-1.0% on the weight of the cement.

Pozzolonic fly ash may be added to react with the calcium hydroxide produced during curing of the cement and to provide better resistance of the coating to sulfate. Sodium nitrite is added as a rust preventive.

The coatings may be produced in any color by the addition of stable color pigments to the formulations. Such color pigments should be inorganic, insoluble in water, chemically inactive, light fast, and of fine particle size.

Air drying of white portland cement compositions containing one of the above mentioned water reducers gives a semi-glossy surface. A similar composition with grey portland cement gives a mat surface. Both white and grey portland cement compositions containing the water reducers can be sprayed to a coating thickness of about 5-15 mils into a mold of water-repellent synthetic polymer with a glossy surface, or a mold coated with such a polymer. The mold may then be back-filled with a conventional concrete, or a lightweight cementitious composition to give, after curing, a product with a highly reflective, and protective surface.

We prefer to formulate our coating compositions as a two component system. The aqueous component contains the latex, water of dilution, and all water-soluble additives. The dry component contains the blend of the powdered constitutents. These components may be stored and shipped separately. Just prior to use, the proper ratio of blended powder is mixed into the liquid component and is then ready for application by spraying, rolling, or brushing. The equipment can be cleaned with fresh water after use. The applied coating is cured and dried in air.

The presently preferred compositions of the invention contain the following components, in the following ratios, expressed in parts by weight:

|  | Component | Parts by Weight |
|---|---|---|
| Powder Component | Mineral cement | 100 |
|  | Mineral Aggregate | 15–100 |
|  | Pozzolonic fly ash | 0–15 |
|  | Calcium stearate | 0–1.0 |
|  | Cement accelerator | 0–3.0 |
|  | Color pigments | 0–5.0 |
| Liquid | Water | 35–50 |
|  | Latex (50–55% solids) | 5–30 |
|  | Water reducer (solids basis) | 0.5–3.0 |

-continued

| Component | Component | Parts by Weight |
|---|---|---|
| | Cement accelerator (solids basis) | 0-3.0 |
| | Retarder | 0.05-0.5 |
| | Sodium nitrite | 0.1-0.3 |

Our application Ser. No. 610,990 describes a method of continuous mixing and placing of cementitious materials in a period of seconds to form well-mixed uniform products. This is achieved by conveying the dry material in a duct by air pressure to the entrance of a static in-line mixing device. There it is wet out with the required amount of an aqueous solution and conveyed through the static mixer to a spray nozzle for placing. The whole operation of mixing and spraying takes place in a fraction of a second.

With the development of our present invention, it has now been found that this method of continuous mixing forms an ideal method of combining the dry and wet components of the coating composition. The dry and wet components are held in separate storage containers and are used as required for any coating operation. There is no waste of material. Only the exact amount required is consumed. After the coating operation is completed, the flow of dry powder and compressed air is shut off, the liquid component is shut off, and the line and static mixer is flushed out with fresh water, thus making it ready for the next coating operation.

This continuous method of mixing and spraying has another very great advantage. It has now enabled us to use cement accelerators to set the cement in a very short time and make the coating ready for use in minutes. It may thus be applied for striping and marking of highways and parking lots and make it ready for immediate use, as well as for other applications.

The invention will now be further illustrated by the following detailed examples, in which all parts are by weight.

DETAILED DESCRIPTION OF THE INVENTION

Table I gives a summary of the compositions of Examples 1 to 18. These compositions are formulated to be sprayable with a small hand-held spray gun attached to a source of 50 psi compressed air. The sprayed materials were coated on steel, concrete, and transite board.

TABLE I

| SPRAYABLE COATING FORMULATIONS - SUMMARY OF EXAMPLES 1 - 18 | | | | | | | | | | | | | | | | | | | |
|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 |
| Liquid Component | | | | | | | | | | | | | | | | | | | |
| Water | 75 | 40 | 50 | 45 | 35 | 32 | 37 | 35 | 35 | 38 | 37 | 80 | 40 | 40 | 75 | 50 | 80 | 40 |
| PVA #2151 | 10 | 10 | 15 | — | — | 10 | 10 | 10 | 10 | 10 | 10 | 10 | 10 | 10 | 10 | 10 | 10 | 10 |
| MC 76 | — | — | — | 15 | 10 | — | — | — | — | — | — | — | — | — | — | — | — | — |
| Lomar D | — | 2 | — | 1 | 1 | 1 | 1 | 2 | 2 | 2 | 2 | — | 2 | 2 | — | 2 | — | 2 |
| Mighty | — | — | 2 | — | — | — | — | — | — | — | — | — | — | — | — | — | — | — |
| NaNO$_2$ | .2 | .2 | .2 | .2 | .2 | .2 | .2 | .2 | .2 | .2 | .2 | .2 | .2 | .2 | .2 | .2 | .2 | .2 |
| Glycol | — | — | .5 | .5 | — | — | .5 | — | — | — | — | — | .5 | .5 | .5 | .5 | .5 | — |
| Glycerine | .1 | .1 | — | — | — | — | — | — | — | .1 | .1 | .1 | .1 | — | — | — | — | — |
| Powder Component | | | | | | | | | | | | | | | | | | | |
| White Portland | 100 | 100 | 100 | 100 | 100 | 100 | 100 | 100 | 100 | 100 | 100 | 100 | 100 | — | — | — | — | 100 |
| Grey Portland Type I | — | — | — | — | — | — | — | — | — | — | — | — | — | 100 | 100 | — | — | — |
| Grey Portland Type III | — | — | — | — | — | — | — | — | — | — | — | — | — | — | — | 100 | 100 | — |
| Fly Ash | — | — | — | — | — | — | — | — | — | 10 | 10 | 10 | 10 | 10 | 10 | 10 | 10 | 10 |
| Calcite 200 Mesh | — | — | — | 80 | 35 | — | 10 | 25 | 25 | 50 | 50 | 50 | 50 | 50 | 50 | 50 | 50 | 50 |
| Novacite 200 Mesh | 60 | 60 | 100 | — | — | — | — | — | — | — | — | — | — | — | — | — | — | — |
| Novacite 100 Mesh | 40 | 40 | — | — | — | — | — | — | — | — | — | — | — | — | — | — | — | — |
| Silica 200 Mesh | — | — | — | — | — | 15 | 15 | — | — | — | — | — | — | — | — | — | — | — |
| Calcium Stearate | — | — | — | — | — | — | — | — | .5 | .5 | .5 | .5 | .5 | .5 | .5 | .5 | .5 | .5 |
| Sika Dry Shot Accelerator | — | — | — | — | — | — | — | — | — | — | — | — | — | — | — | — | — | 2 |
| Black Fe$_2$O$_3$ | — | — | 2 | — | — | — | — | — | — | — | — | — | — | — | — | — | — | — |
| Yellow Fe$_2$O$_3$ | — | — | — | 3 | — | — | — | — | — | — | — | — | — | — | — | — | — | — |

Examples 1 and 2 were designed to show the effect of one of the water reducers (Lomar D). It is evident that much more water was required to obtain a sprayable composition in the absence of the water reducer. The contrast in behavior of the two samples was quite pronounced. Although both samples were thixotropic (as were all the other samples), Sample No. 2 flowed in a constant stream when transferred to the spray gun reservoir, while Sample No. 1 fell off in discontinuous blobs. After air drying the approximately 5 mil thick coatings on steel, coating No. 2 was adherent, tough, scratch-resistant, and semi-glossy. When subjected to the flame of a propane torch at 1925° C, the coating did not flame or char. Coating No. 1 was powdery, easily removable, and dull. Novacites are Arkansas microcrystalline silicas.

Examples 3 and 4 show the use of color pigments to produce a grey and a yellow coating. Examples 5 to 11 are reproduced to demonstrate some of the variations in formulation. PVA #2151 (Borden) is a polyvinyl acetate-acrylic copolymer emulsion. MC76 (Rohm & Haas) is a polyacrylic emulsion. 2% water reducer on the weight of the cement (#8-11) gave a decided semi-glossy appearance of the air-dried surface. They all withstood the propane torch test with a flame of 1925° C, without showing any burning or charring.

The matched Samples #12 and #13, #14 and #15, and #16 and #17, with and without water reducer, showed the same comparable effects of this reagent on both the water requirements and the properties of the paint slurries and the cured paint films as shown earlier by Samples #1 and #2. Samples Nos. 13, 14 and 16 were adherent to steel and scratch-resistant. No. 13 was also semi-glossy. Nos. 12, 15 and 17 dried to a powdery, weak films. Formulations numbers 13, 14 and 16 were also sprayed into molds of polystyrene and polyethylene plastics and into metal pans surface treated with a silicon resin, all with glossy surfaces. The sprayed films were about 15 mils thick. The molds were then backfilled with lightweight portland cement compositions of about 40 pounds per cubic foot density. Some of the sprayed molds were also filled with dense concrete. After curing at room temperature for two days, the panels were removed from the molds, showing the surface in contact with the mold surface to be protective and decorative, highly reflective and waterproof.

The dry and wet components of Sample #13 was prepared on a larger scale. The powder component was metered into a duct and conveyed with compressed air to a static in-line mixing device. Just before the static mixer in the duct, the liquid component was metered into the same duct in such a ratio as to contact three parts by weight of the powder with one part by weight of the liquid. The combined mixture was conveyed by air pressure through the static mixer and was ejected by a spray nozzle unto a steel substrate. This gave a uniform coating on the steel surface which dried to an adherent, tough coating. The equipment was cleaned up with fresh water after shutting off the feed lines and the air pressure.

For Sample #18, a Sika dry shot accelerator was blended with the dry powder before mixing, then mixed quickly into the liquid component, and brush coated on steel, within less than one minute after combining the two components. After another one minute, the composition was too stiff to move. After a total of four minutes, the mix had cured to a hard concrete. The brush-coated film was adherent and tough.

Obviously it is not practical to handle such fast curing formulations in the above manner. However, we made use of the set up for continuous mixing and spraying described for Sampel 13. The blended powder component of Sample 18 was metered into the duct as before. One part of the corresponding liquid component of Sample 18 was then contacted continuously with three parts of the blended powder. The mixture was conveyed continuously through the static mixer and through the spray nozzle unto a steel substrate to give good costings which cured in a few minutes. As soom as the feed lines and air pressure were shut off, fresh water was flushed through the lines to clean them of any residual cement.

We claim:

1. A coating of about 2 mils to about 60 mils thickness of an hydraulic cement composition which comprises in weight percent a dry component of mineral cement selected from the group of portland and calcium aluminate cement, 100; a mineral aggregate of 100 mesh or finer selected from the group of calcite and silica and mixtures thereof, 15-60; pozzolonic fly ash, 0-15; calcium stearate, 0-1; color pigments, 0-5; and a cement accelerator, 0-3; and a liquid component to be admixed to the dry component, of water, 35-50; a synthetic polymer latex selected from the group of polymers which are film-forming at ambient temperature, 5-30, with an equivalent polymer solids of 2.5-16; a super water reducer selected from the group of polymers comprising the alkali metal salts of melamine sulfonic acid partially condensed with formaldehyde, the alkali metal salt of naphthalene sulfonic acid partially condensed with formaldehyde, and about 30-90 percent of the alkali metal salt of a high molecular weight condensation product of naphthalene-sulfonic acid and the balance 70-10 percent being the alkali salt of gluconic acid, 0.5-3.0; sodium nitrite, 0.1-0.3; a cement accelerator, on a dry basis, 0-3; and a cement retarder, 0.05-0.5.

2. A process for the preparation of an improved coating of about 2 mils to about 60 mils thickness suitable for spray application, containing hydraulic cement, which comprises intermixing, in parts by weight, a blended dry component of hydraulic cement, 100, finely divided mineral aggregate, 15-60, pozzolonic fly ash, 0-15, calcium stearate, 0-1.0, and color pigments, 0-5, with a liquid component of water, 35-50, a synthetic polymer latex, 5-30, with equivalent polymer solids, 2.5-16, a super water reducer, 0.5-3.0, sodium nitrite, 0.1-0.3, and a cement retarder, 0.15-0.5, and placing the resulting mixture on a substrate until it sets.

3. A process according to claim 2 wherein the hydraulic cement is selected from the group of portland cement and calcium aluminate cement.

4. A process according to claim 2 wherein the finely divided mineral aggregate is 100 mesh or finer, and is selected from the group of minerals calcite, silica, aluminum oxide, aluminum trihydrate, and mixtures thereof.

5. A process according to claim 2 wherein the synthetic polymer latex is an emulsion of polymers which are film-forming at room temperature.

6. A process according to claim 2 wherein the super water reducer is selected from the group of polymers comprising the alkali metal salts of melamine sulfonic acid partially condensed with formaldehyde, the alkli metal salt of naphthalene sulfonic acid partially condensed with formaldehyde, and about 30-90 percent of the alkali metal salt of a high molecular weight condensation product of naphthalene-sulfonic acid and the balance 70-10 percent being the alkali salt of gluconic acid.

7. A process according to claim 2 wherein the dry and wet components are metered into a common duct from separate containers, are contacted in measured ratios just before an in-line static mixing device in the duct, the mixture is conveyed through the static mixer by air pressure and is discharged through a spray nozzle unto a substrate.

8. A process according to claim 7 wherein one of the components contains a hydraulic cement accelerator.

* * * * *